United States Patent
Batni et al.

(10) Patent No.: US 7,630,313 B2
(45) Date of Patent: Dec. 8, 2009

(54) SCHEDULED DETERMINATION OF NETWORK RESOURCE AVAILABILITY

(75) Inventors: Ramachendra P. Batni, Phoenix, AZ (US); Chen Fan, Beijing (CN); Ranjan Sharma, New Albany, OH (US); Yu Jun Zhu, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 811 days.

(21) Appl. No.: 10/954,573

(22) Filed: Sep. 30, 2004

(65) Prior Publication Data

US 2006/0067227 A1    Mar. 30, 2006

(51) Int. Cl.
*H04L 12/28* (2006.01)
(52) U.S. Cl. ............................. 370/235; 370/252
(58) Field of Classification Search ............ 370/235, 370/236, 236.1, 236.2, 252, 253; 709/223–226
See application file for complete search history.

(56) References Cited

U.S. PATENT DOCUMENTS

| 5,627,766 | A | * | 5/1997 | Beaven | 702/122 |
| 5,909,549 | A | * | 6/1999 | Compliment et al. | 709/223 |
| 6,542,600 | B1 | | 4/2003 | Munson et al. | |
| 6,594,305 | B1 | * | 7/2003 | Roeck et al. | 375/222 |
| 6,615,258 | B1 | | 9/2003 | Barry et al. | |
| 6,714,519 | B2 | * | 3/2004 | Luzzatti et al. | 370/252 |
| 6,747,957 | B1 | * | 6/2004 | Pithawala et al. | 370/252 |
| 2004/0120260 | A1 | * | 6/2004 | Bernier et al. | 370/252 |
| 2005/0262244 | A1 | * | 11/2005 | Smyth et al. | 709/226 |

* cited by examiner

*Primary Examiner*—Ricky Ngo
*Assistant Examiner*—Gary Mui
(74) *Attorney, Agent, or Firm*—Carmen Patti Law Group, LLC

(57) ABSTRACT

A network controller of a wireless and/or wireline telecommunications network of an apparatus in one embodiment makes a scheduled determination of an availability of a network resource, of the wireless and/or wireline telecommunications network, based on a determination of success or failure in timely arrival of a message from the network resource.

17 Claims, 5 Drawing Sheets

SCHEDULED DETERMINATION OF NETWORK RESOURCE AVAILABILITY

TECHNICAL FIELD

The invention relates generally to telecommunication networks and more particularly to resource availability.

BACKGROUND

Many electronic and/or telecommunication services are provided by a plurality of electronic devices within a network. Exemplary services comprise mobile phone service, data processing, and distributed software applications. Support procedures for the services and the services themselves are divided into a plurality of tasks, for example, control tasks and resource tasks. The tasks are divided among the plurality of electronic devices. Service providers employ a client/server architecture to organize the electronic devices for control tasks and resource tasks. For example, a network controller distributes tasks to a plurality of network resources, as will be appreciated by those skilled in the art.

To provide a high level of availability of the service to a user, requests for service must be handled quickly. In known networks, the network controller sends a request to a network resource, for example, a first network resource of the plurality of network resources. If the network resource does not respond in a timely manner or provides a response that indicates an error, the network controller must send an additional request to another network resource in an attempt to fulfill the request for service. For each additional request, service availability and management efficiency is reduced and service response times between a receipt of the request for service and a fulfillment of the request are increased.

Upon a failed response from a network resource, the network controller generates a system error. The network controller requires special software modules and/or triggers to detect the fault of the network resource and generate the system error. The software triggers merely react to a problem that has already occurred with the network resource and only do so when the network resource is needed for fulfillment of the request for service. In addition, service providers must purchase the special software triggers as extra modules to the control and resource tasks that provide the actual service. A technician of the network must analyze the system error and determine if the cause of the failed response was a failure of a network resource. If the network resource is found to be at fault, the technician must manually intervene to prevent further requests from being sent to the network resource. Time spent on analysis of the system error and manual intervention further decreases service availability and management efficiency.

Thus, a need exists for an increase in service availability and a decrease in service response times.

SUMMARY

A network controller and one or more network resources provide a service, for example, a mobile phone service. For example, the network controller receives a request for the service from a call and directs the call to one of the network resources. To promote an increase in reliability of the service, the network controller proactively updates a table of availability statuses that correspond to the network resources. The network controller performs a scheduled determination of availability of the network resources based on one or more messages received from the network resources. The network resources perform a scheduled transmission of the messages to the network controller.

In one embodiment, there is provided an apparatus comprising a network controller of a wireless and/or wireline telecommunications network that makes a scheduled determination of an availability of a network resource, of the wireless and/or wireline telecommunications network, based on a determination of success or failure in timely arrival of a message from the network resource.

In another embodiment, there is provided for an apparatus comprising a network resource of a wireless and/or wireline telecommunications network that performs a scheduled transmission of a status message to a network controller of the wireless and/or wireline telecommunications network to indicate an availability of the network resource.

In yet another embodiment, there is provided a method for making a scheduled determination of an availability of a network resource, of a wireless and/or wireline telecommunications network, based on a determination of success or failure in timely arrival of a message from the network resource.

DESCRIPTION OF THE DRAWINGS

Features of exemplary implementations of the invention will become apparent from the description, the claims, and the accompanying drawings in which:

DETAILED DESCRIPTION

Figure 1:
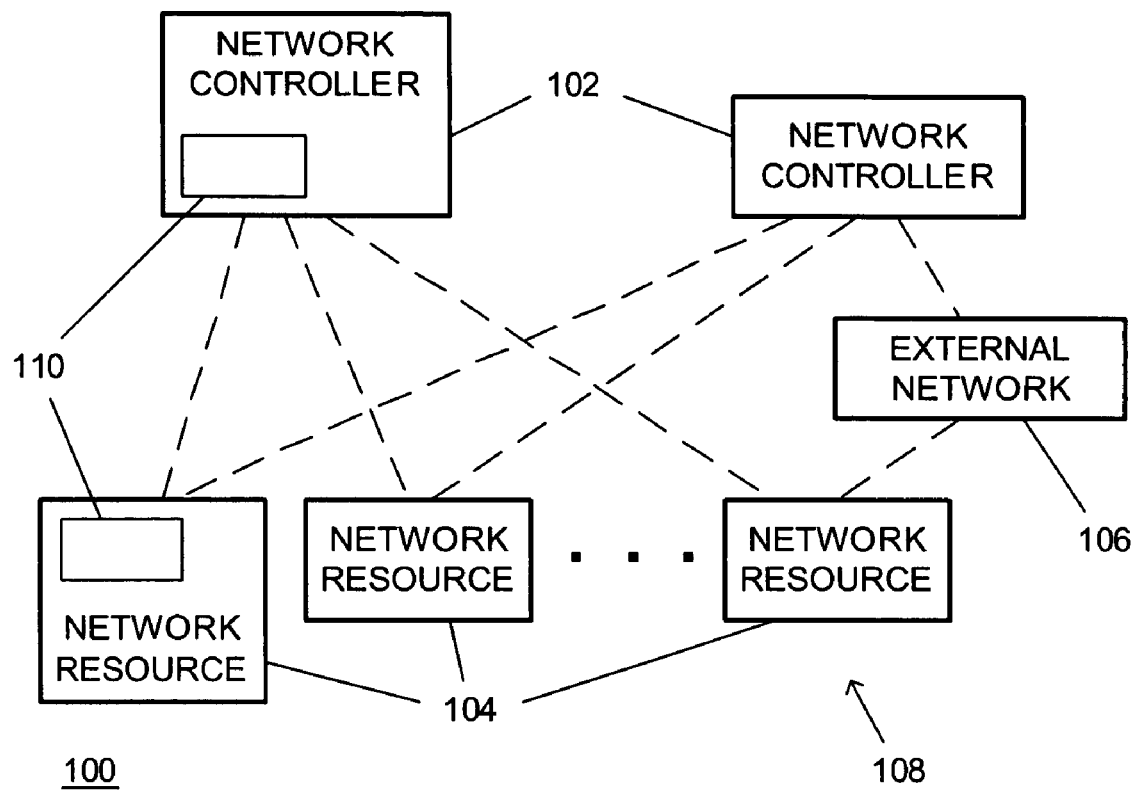
FIG. 1 is a representation of one implementation of an apparatus that comprises one or more network controllers, one or more network resources, and/or one or more network routers.

Turning to FIG. 1, an apparatus 100 in one embodiment comprises one or more network controllers 102, one or more network resources 104, and/or one or more network routers 106. The network controller 102 and the network resource 104 in one embodiment comprise intelligent network platforms, for example, telephony network platforms. The network controller 102 and the network resource 104 support intelligent network technology and standards to provide a service, for example, a mobile phone service. The network controller 102 and the network resource 104 in another embodiment comprise a server and a client of a distributed architecture that provides a service, for example, a distributed software application. The network controllers 102 and the network resources 104 in one embodiment comprise an instance of a recordable data storage medium 110, as described herein.

The network controller 102 comprises a table of availability statuses and identifiers that correspond to one or more of the network resources 104. For example, the table comprises a local, provisionable table stored in the recordable data storage medium 110 of the network controller 102. Exemplary availability statuses comprise in-service and out-of-service. For example, the network controller 102 employs the availability statuses to estimate whether a network resource 104 is currently able to receive requests and/or provide a portion of the service. Exemplary identifiers comprise Internet Protocol ("IP") addresses and/or network names of the network resources 104. The network controller 102 employs the identifiers of the table to determine destination addresses for messages to be sent to the network resources 104. Where the identifier comprises an IP address of the network resource 104, the IP address comprises the destination address. Where the identifier comprises a network name of the network resource 104, the network controller 102 performs a table lookup with the network name to determine the IP address for the request, as will be appreciated by those skilled in the art. The network resource 104 in one embodiment comprises a table of identifiers for the network controllers 102 and/or a heartbeat frequency, as described herein. For example, the table comprises a local, provisionable table stored in the recordable data storage medium 110 of the network resource 104.

The network controller 102 and the network resource 104 in one embodiment comprise wireless intelligent network ("WIN") platforms. In a further embodiment, the network controller 102 and the network resource 104 comprise Customized Applications for Mobile network Enhanced Logic ("CAMEL") platforms. The network controller 102 and the network resource 104 in one embodiment comply with one or more American National Standards Institute ("ANSI") and/or European Telecommunications Standards Institute ("ETSI") intelligent network standards. In one embodiment where the network controller 102 and the network resource 104 comprise a call controller and a tone server of the wireless and/or wireline telecommunications network 108, the network controller 102 and the network resource 104 provide a user-defined tone service to a user of the wireless and/or wireline telecommunications network 108.

The network controller 102 and the network resource 104 in one embodiment are combined into a single platform. For example, the network controller 102 and the network resource 104 comprise software components and/or modules that are executed on a single server, for example, a service control point or a service node of the wireless and/or wireline telecommunications network 108. In another embodiment, the network controller 102 and the network resource 104 are divided into a plurality of network platforms and/or software components. In one embodiment, the network controller 102 comprises a service control point and the network resource comprises an intelligent peripheral, or the network controller 102 and the network resource 104 comprise separate service control points. In another embodiment, a first and a second network platform each comprise one or more network controllers 102 and one or more network resource 104. A network controller 102 of the first network platform may communicate with a network resource 104 of the second network platform and a network resource 104 of the first platform may communicate with a network controller of the second network platform. A plurality of network platforms may be used to increase capacity and/or redundancy of the service provided by the network controller 102 and the network resource 104. For example, the wireless and/or wireline telecommunications network 108 comprises a first and second network controller 102 in a 1+1 configuration and a plurality m of network resources 104 in N+k configuration, as will be appreciated by those skilled in the art.

The network controllers 102 employ the network resources 104 to provide the service. For example, the network controller 102 receives a request for the service from a call and directs the call to one of the network resources 104. To promote an increase in reliability of the service, the network controller 102 updates the table of availability statuses and identifiers based on one or more messages received from the one or more network resources, as described herein. The network controller 102 and the network resource 104 communicate with each other through employment of one or more communication protocols. Exemplary communication protocols comprise Internet Protocol ("IP"), Lightweight Directory Access Protocol ("LDAP"), Simple Network Management Protocol ("SNMP"), and/or a proprietary protocol. The proprietary protocol in one embodiment is based on the TCP/IP and/or UDP/IP protocol. For example, the network controller 102 employs the TCP/IP protocol to transmit a request to the network resource 104 and the network resource employs the TCP/IP protocol to send a response to the network controller 102, as will be appreciated by those skilled in the art.

The network router 106 in one embodiment comprises a router or switch capable of routing, forwarding, multicasting, and/or switching network traffic between network devices. Exemplary network traffic comprises packet-switched and/or circuit-switched messages, such as TCP/IP messages. Where the network controller 102 and the network resource 104 are not directly connected, one or more network routers 106 cooperate to transmit messages between the network controller 102 and the network resource 104. The network router 106 in one embodiment translates a message between different protocols before routing the message, as will be appreciated by those skilled in the art.

An illustrative description of exemplary operations of the apparatus 100 is presented, for explanatory purposes. While the following steps are described for only a single network controller 102 and a single network resource 104, multiple instances of the steps may be carried out in series or parallel for a plurality of network controllers 102 and a plurality of network resources 104, as will be appreciated by those skilled in the art.

Figure 2:
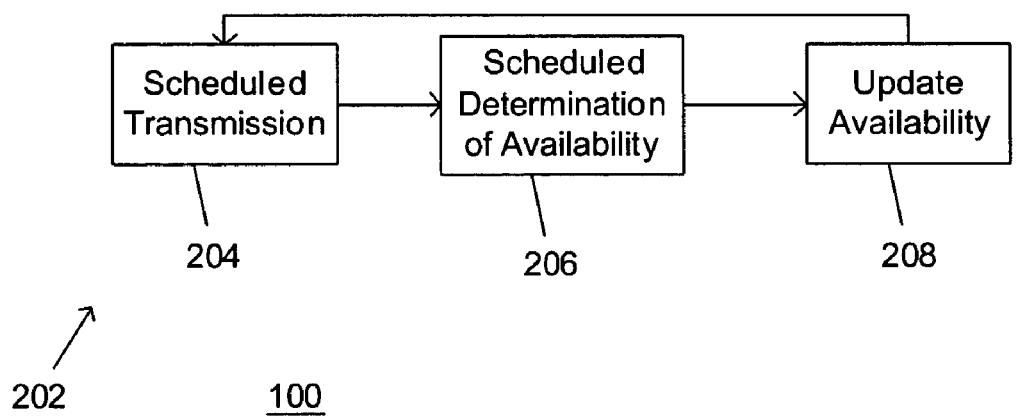
FIG. 2 is a representation of one exemplary logic flow of the apparatus of FIG. 1.

Turning to FIG. 2, a logic flow 202 comprises STEPS 204, 206 and 208. The network resource 104 in one embodiment performs the STEP 204. The network controller 102 and/or the network router 106 perform the STEPS 206 and 208. In STEP 204, a scheduled transmission of a status message 312 (FIG. 3) is performed to indicate an availability status of the network resource 104. The scheduled transmission in one embodiment comprises a scheduled, synchronous transmission. In STEP 206, a scheduled determination of the availability status of the network resource 104 is performed. The scheduled determination is based on a success or failure in timely arrival of the status message 312. The scheduled determination in one embodiment comprises a scheduled, synchronous determination. In STEP 208, the availability status of the network resource 104 is updated based on the scheduled determination of availability status. In one embodiment, the availability status is updated synchronously, for example, after the scheduled determination. In another embodiment, the availability status is updated asynchronously, for example, automatically without user intervention, as will be appreciated by those skilled in the art.

Figure 3:
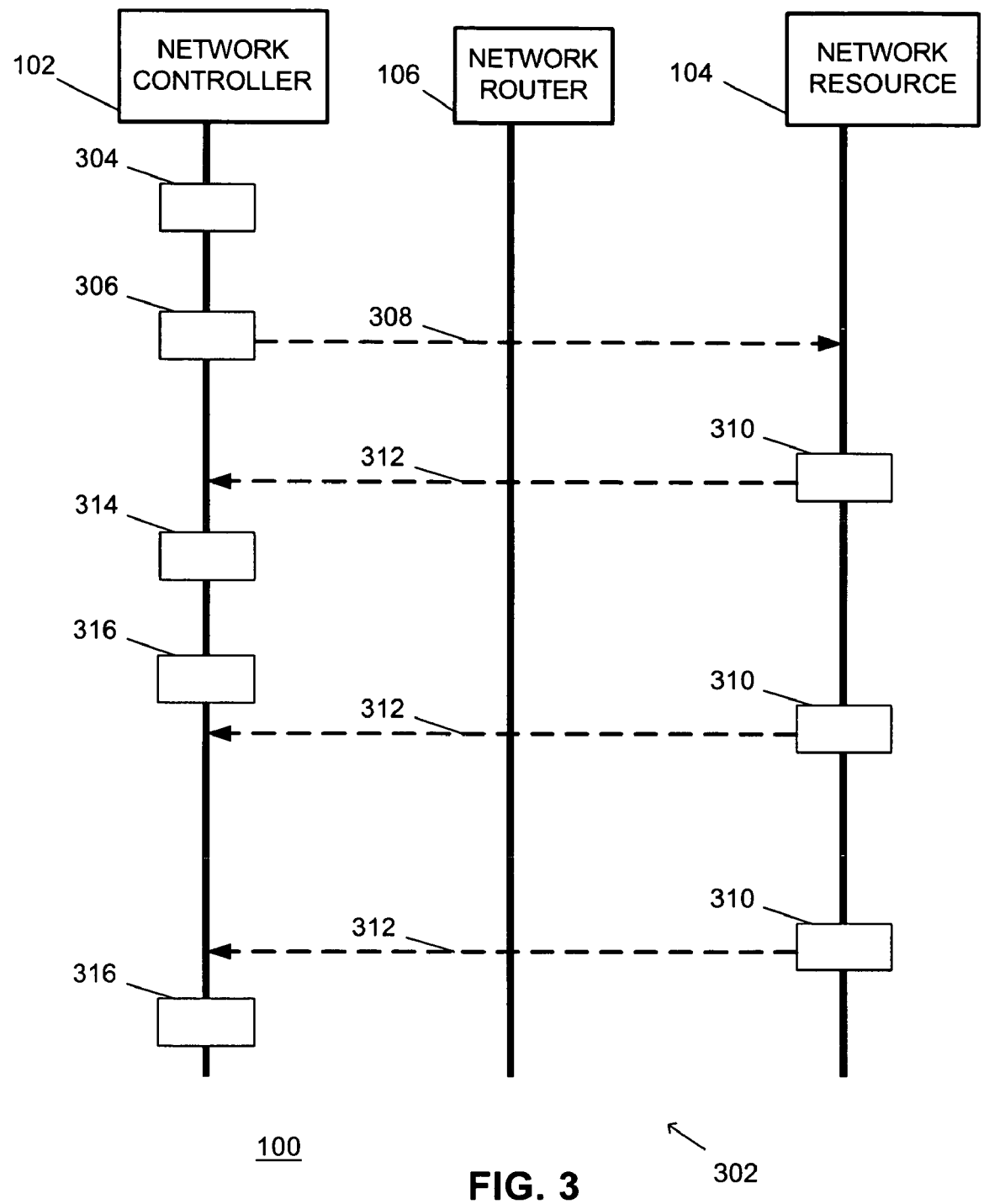
FIG. 3 is a representation of one exemplary message flow for an exemplary initialization and operation of the network controller of the apparatus of FIG. 1.

Turning to FIG. 3, a message flow 302 in one embodiment comprises an exemplary initialization of the network controller 102 upon a startup of a first network controller 102. In another embodiment, the message flow 302 corresponds to a second network controller 102 that initializes to provide redundancy for the first network controller 102 and/or increased capacity for the service, as will be appreciated by those skilled in the art. The message flow 302 comprises STEPS 304, 306, 310, 314, and 316. The network controller 102 performs STEPS 304, 306, 314 and 316. The network resource 104 performs STEP 310.

Upon a startup of the network controller 102, the network controller 102 in one embodiment initializes (STEP 304) the availability status of the network resource 104 to out-of-service. The network controller 102 sends (STEP 306) a request 308 to the network resource 104 through employment of the identifier of the network resource 104. For example, the request 308 comprises a request for availability status of the network resource 104. In one embodiment, the network controller 102 sends the request 308 directly to the network resource 104. In another embodiment, the network controller 102 sends the request 308 through one or more intermediaries, for example, the network routers 106, as will be appreciated by those skilled in the art.

At STEP 310, the network resource 104 receives the request 308. In one embodiment, the network resource 104 verifies authenticity of the request 308. For example, the network resource 104 determines if the table comprises an entry for the network controller 102. Upon verification, the network resource 104 initiates a scheduled transmission (STEP 310) of one or more status messages 312 to the network controller 102. In another embodiment, the network resource 104 sends a status message 312 to the network controller 102 immediately upon receipt and verification of the request 308 and initiates the scheduled transmission. In yet another embodiment, the network resource 104 performs an initialization prior to initiating the scheduled transmission.

The scheduled transmission is based on a first heartbeat frequency, for example, a cyclic timer. Where the first heartbeat frequency comprises six cycles per minute (i.e. 0.1 Hz), the network resource 104 sends a status message 312 to the network controller 102 every 10 seconds. In one embodiment, the request 308 comprises the first heartbeat frequency. In another embodiment, the network resource 104 obtains the first heartbeat frequency from the local, provisionable table. In yet another embodiment, the network resource 104 obtains the first heartbeat frequency from the provisionable table of the network controller 102.

The status messages 312 in one embodiment comprise a timestamp that serves to indicate when the status message 312 was sent. In another embodiment, the status messages 312 do not comprise a timestamp. For example, the network controller 102 generates a timestamp for the status message 312 upon arrival of the status message 312. The status messages 312 from the network resource 104 serve to indicate an availability of the network resource 104. For example, the status message 312 serves to indicate that the network resource 104 is in-service, as will be appreciated by those skilled in the art.

The network controller 102 receives (STEP 314) the status message 312 from the network resource 104. In one embodiment, the network controller stores the timestamp of the status message 312 in the recordable data storage medium 110. In another embodiment, the network controller 102 generates and stores a current timestamp upon arrival of the status message 312 in the recordable data storage medium 110. In one embodiment, the network controller 102 overwrites a timestamp of a previous status message 312 with a timestamp of a most recently received status message 312.

The network controller 102 performs a scheduled determination (STEP 316) of the availability of the network resource 104. The scheduled determination in one embodiment is based on a second heartbeat frequency. The second heartbeat frequency in one embodiment is stored in the table on the network controller 102, for example, in the recordable data storage medium 110. For example, where the second heartbeat frequency comprises a frequency of 0.05 Hz, the network controller 102 performs the scheduled determination every twenty seconds, as will be appreciated by those skilled in the art.

The scheduled determination in one embodiment comprises a determination of success or failure in timely arrival of a status message 312 from the network resource 104, for example, a most recently received status message 312. The network controller 102 performs a comparison of the timestamp of the status message 312, for example, the timestamp stored in the recordable data storage medium 110, with a current timestamp. For example, the network controller 102 calculates a difference between the current timestamp and the timestamp of the most recently received status message 312. Where the timestamp is from the status message 312, a time-zone conversion may be necessary when comparing the timestamps. The time-zone conversion may be performed upon storing the timestamp, or upon calculation of the difference. Where the timestamp is generated by the network controller 102 upon arrival of the status message 312, the time-zone conversion is not necessary. A difference that is less than or equal to a pre-determined time interval comprises a success in timely arrival of the status message 312. A difference that is greater than the pre-determined time interval comprises a failure in timely arrival of the status message 312. The status message 312 may arrive late or not at all, for example, if the network resource 104 or the network router 106 has encountered an error and shutdown, in which case the network controller 102 employs the timestamp of the previously received status message 312. The pre-determined time interval in one embodiment is greater than or equal to two times a period that corresponds to twice the first heartbeat frequency. For example, where the first heartbeat frequency comprises ten seconds, the pre-determined time interval comprises twenty seconds. In this embodiment, a status message 312 may arrive late but the network resource 104 is still considered in-service to reduce a number of false out-of-service determinations, as will be appreciated by those skilled in the art.

Upon the scheduled determination, the network controller 102 updates the table of availability statuses. Upon a determination of failure, the network controller 102 updates the availability status to out-of-service. In one embodiment, the network controller 102 synchronously updates the network resource 104 to in-service upon the scheduled determination after a successful arrival of a most recently received status message 312. In another embodiment, the network controller 102 asynchronously updates the availability status to in-service immediately upon receipt of the most recently received status message 312. For example, the network controller 102 updates the availability status in real-time.

Figure 4:
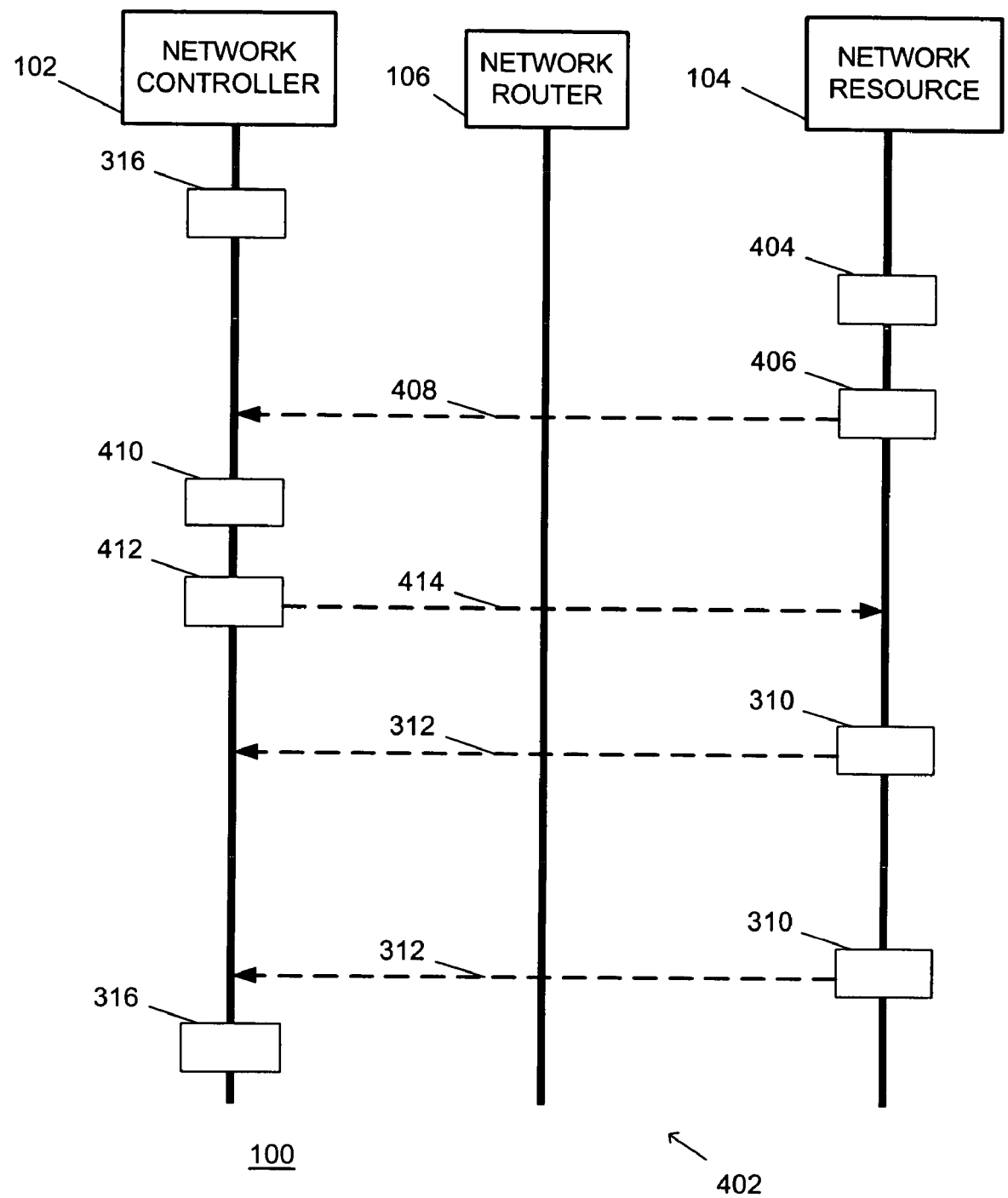
FIG. 4 is a representation of one exemplary message flow for an exemplary initialization and operation of the network resource of the apparatus of FIG. 1.

Turning to FIG. 4, a message flow 402 comprises an exemplary initialization of the network resource 104 where the network controller 102 has already begun the scheduled determination (STEP 316). The message flow 402 comprises the STEPS of 404, 406, 410, 412, 310 and 316. The network controller 102 performs STEP 316 and the network resource 104 performs STEPS 404 and 310. In a further embodiment, the network controller 102 performs STEPS 410 and 412 and the network resource 104 performs STEP 406.

The network resource 104 performs an initialization (STEP 404) to prepare for an in-service availability. The network resource 104 sends (STEP 406) an initialization message 408 to the network controller 102. The initialization message 408 serves to indicate that the network resource 104 is in-service, as will be appreciated by those skilled in the art.

In one embodiment, upon receipt of the initialization message 408, the network controller 102 verifies authenticity of the initialization message 408 for security. For example, the network controller 102 determines if the table of availability statuses and identifiers comprises an entry for the network resource 104. If the table does not comprise an entry for the network resource 104, the network controller 102 in one embodiment adds (STEP 410) a new entry in the table with an identifier and availability status for the network resource 104. In another embodiment where the table does not comprise an entry for the network resource 104, the network controller 102 ignores the initialization message 408 and generates an error message.

The network controller 102 sends (STEP 412) a confirmation message 414 to the network resource 104. The confirmation message 414 in one embodiment comprises the first heartbeat frequency. In another embodiment, the network resource 104 obtains the first heartbeat frequency from the recordable data storage medium 110. Upon receipt of the confirmation message 414, the network resource 104 initiates the scheduled transmission (STEP 310) to the network controller. The scheduled determination (STEP 316) and the scheduled transmission (STEP 310) continue as described above.

Figure 5:
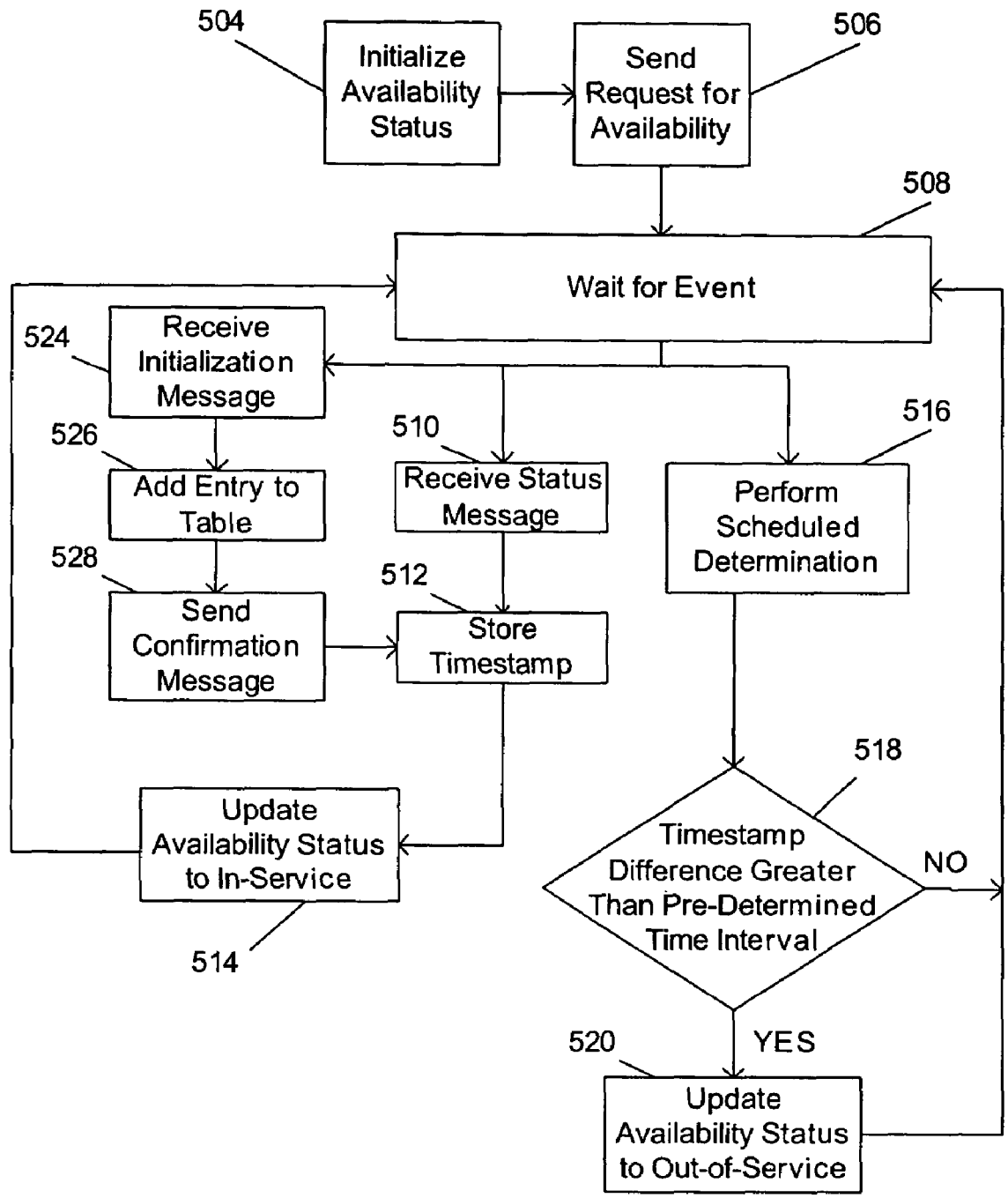
FIG. 5 is a representation of one exemplary logic flow for the network controller of the apparatus of FIG. 1.

Turning to FIG. 5, an exemplary logic flow 502 comprises STEPS 504, 506, 508, 510, 512, 514, 516, 518, 520, 522, 524, 526 and 528. The network controller 102 performs STEPS 504, 506, 508, 510, 512, 516, 518 and 520. In a further embodiment, the network controller 102 performs STEPS 514, 524, 526 and 528. At STEP 504, the network controller 102 initializes the availability status of the network resource 104 to an out-of-service status. The network controller 102 sends (STEP 506) the request 308 to the network resource 104 and initiates the scheduled determination. For example, the network controller 102 sets a timer that corresponds to the second heartbeat frequency. The network controller 102 waits (STEP 508) for any of a receipt of a status message 312, an expiration of the timer, and a receipt of an initialization message 408.

Where the network controller 102 receives (STEP 510) a status message 312 from the network resource 104, the network controller 102 in one embodiment stores (STEP 512) the timestamp of the status message 312. In another embodiment, the network controller 102 generates a current timestamp for the status message 312 upon arrival of the status message 312. In one embodiment, the network controller 102 performs (STEP 514) an asynchronous update of the availability status of the network resource 104. The asynchronous update of the availability status allows the network resource 104 to be brought into service as soon as possible, instead of waiting for the next expiration of the timer, as will be appreciated by those skilled in the art. In another embodiment, the network controller 102 skips STEP 514 and returns to STEP 508 after storing the timestamp of the status message 312. The network controller 102 then updates the availability status upon the scheduled determination, as described herein.

Upon the expiration of the timer, the network controller 102 performs (STEP 516) the scheduled determination of the availability status and resets the timer. The network controller 102 performs (STEP 518) a comparison between the current timestamp and the timestamp stored by the network controller 102. If the difference between the current time stamp and the timestamp stored by the network controller 102 is greater than the pre-determined time interval, the network controller 102 updates (STEP 520) the availability status of the network resource 104 to out-of-service and returns to STEP 508. If the difference is less than or equal to the pre-determined time interval, the network controller 102 returns to STEP 508.

If the network controller 102 receives (STEP 524) an initialization message 408 from another network resource 104, the network controller 102 adds (STEP 526) an entry to the table of availability statuses if necessary, as described above. The network controller 102 sends (STEP 528) a confirmation message 414 to the network resource 104 and proceeds to STEP 512.

Figure 6:
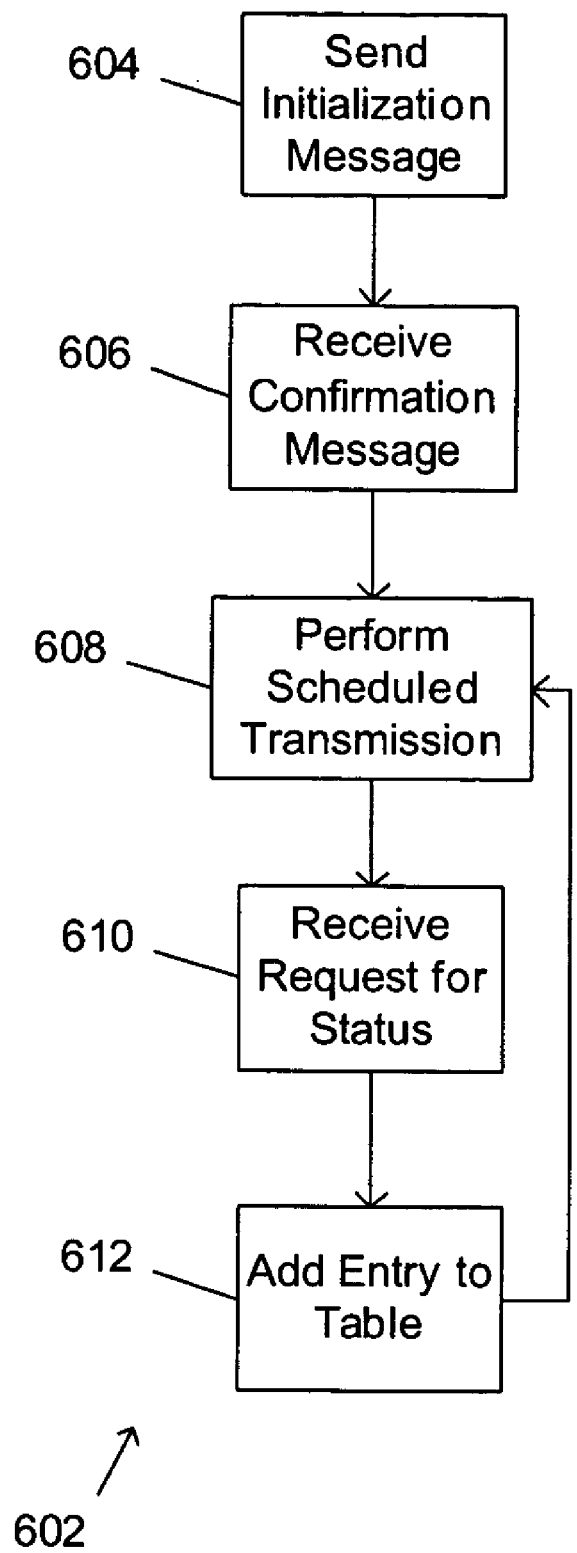
FIG. 6 is a representation of one exemplary logic flow for the network resource of the apparatus of FIG. 1.

Turning to FIG. 6, an exemplary logic flow 602 comprises STEPS 604, 606, 608, 610 and 612. The network resource 104 performs STEPS 608 and 610. In a further embodiment, the network resource 104 performs STEPS 604 and 606. In another embodiment, STEP 612 is additionally performed by the network resource 104. In STEP 604, the network resource 104 sends an initialization message 408 to one or more first network controllers 102. In one embodiment, the network resource 104 obtains an address for the first network controllers 102 from the table of the network resource 104. The network resource 104 receives (STEP 606) a confirmation message 414 from the first network controllers 102. In STEP 608, the network resource 104 initiates the scheduled transmission of the status messages 312 to the first network controllers 102 that sent the confirmation message 414.

The network resource 104 in one embodiment receives (STEP 610) a request 308 from a second network controller 102. In one embodiment, upon receipt of the request 308, the network resource 104 determines if the table of the network resource 104 comprises an entry, for example, a network ID, for the controller 102. If the table does not comprise an entry for the network controller 102, the network resource 104 in one embodiment adds (STEP 612) a new entry in the table for the network controller 102. In another embodiment where the table does not comprise an entry for the network controller 102, the network resource 104 ignores the request 308 and generates an error message. The network resource 104 proceeds to STEP 608 to perform the scheduled transmission of status messages 312 to the network controllers 102.

In another embodiment where the network resource 104 comprises the table of the network controllers 102, the network resource 104 skips STEPS 604 and 606. In this embodiment, the network resource 104 initiates the scheduled transmission to each of the network controllers 102 in the table immediately upon initialization of the network resource 104.

The apparatus 100 in one embodiment comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one embodiment employs one or more computer-readable signal-bearing media. The computer-readable signal-bearing media store software, firmware and/or assembly language for performing one or more portions of one or more embodiments of the invention. Examples of a comptiter-readable signal-bearing medium for the apparatus 100 comprise the recordable data storage medium 110 of the network controller 102 and the recordable data storage medium 110 of the network resource 104. The computer-readable signal-bearing medium for the apparatus 100 in one embodiment comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another embodiment, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a network controller of a wireless and/or wireline telecommunications network that makes a scheduled determination of an availability of a network resource of a plurality of network resources, of the wireless and/or wireline telecommunications network, based on a determination of success or failure in timely arrival of a status message from the network resource;
    wherein the network controller comprises a table of a plurality of availability statuses that correspond to the plurality of network resources;
    wherein, upon an initialization of the network controller, the network controller sends a request for availability status with a heartbeat frequency to the plurality of network resources to initiate a scheduled transmission by the network resources of one or more status messages from the network resources to the network controller at the heartbeat frequency;
    wherein each of the plurality of network resources performs a scheduled, synchronous transmission of one or more status messages to the network controller to indicate an in-status availability of the respective network resource;
    wherein the network controller performs a plurality of scheduled, synchronous determinations of an availability of the network resources, wherein a difference between a current time stamp and the timestamp of a most recently received status message that is less than or equal to a pre-determined time interval comprises a success in timely arrival and an "in-service" availability, wherein a difference between the current time stamp and the timestamp of the most recently received status message that is greater than a pre-determined time interval comprises a failure in timely arrival and an out-of-service availability;
    wherein the network controller performs an update of the availability status from in-service to out-of-service upon the determination of out-of-service availability;
    wherein the network controller performs an asynchronous update of the availability status that corresponds to the network resource from out-of-service to in-service upon a receipt of another status message of the one or more status mess from the network resource.

2. The apparatus of claim 1,
    wherein the scheduled determination of the availability of the network resource comprises the in-service availability;
        upon the success in timely arrival of the most recently received status message from the network resource; or
        upon the arrival of the most recently received status message from the network resource.

3. The apparatus of claim 2, wherein the network controller performs an update of an availability status of the network resource from in-service to out-of-service upon the out-of-service availability;
    wherein the network controller performs an update of the availability status of the network resource from out-of-service to in-service upon the in-service availability.

4. The apparatus of claim 2, wherein the network controller performs an update of an availability status of the network resource from in-service to out-of-service upon the out-of-service availability;
    wherein the network controller performs an update of the availability status of the network resource from out-of-service to in-service upon a receipt of another status message of the one or more status messages from the network resource.

5. The apparatus of claim 1, wherein the pre-determined time interval is one or more of:
    stored in a local, provisionable table on the network controller; and/or
    greater than or equal to two times a period of the heartbeat frequency of the one or more status messages from the network resource.

6. The apparatus of claim 1, wherein the network controller comprises a table of the plurality of network resources;
    wherein the network controller receives an initialization message from another network resource that is not in the table of the plurality of network resources;
    wherein the network controller performs an addition of the other network resource to the table of the plurality of network resources;
    wherein the network controller performs an addition of another availability status that corresponds to the other network resource to the table of the plurality of availability statuses;
    wherein the network controller performs an initialization of the other availability status to in-service;
    wherein the network controller sends a confirmation message for the initialization message to the other network resource to initiate a scheduled transmission of one or more status messages from the other network resource to the network controller;
    wherein, upon the initialization of the other availability status, the scheduled determination comprises a scheduled determination of an availability of each of the one or more network resources based on a determination of success or failure in timely arrival of the one or more status messages from the one or more network resources and a scheduled determination of an availability of the other network resource based on a determination of success or failure in timely arrival of the one or more status messages from the other network resource.

7. The apparatus of claim 1,
    wherein the network controller receives an initialization message from another network resource that is not in the table of the plurality of network resources;
    wherein the network controller ignores the initialization message from the other network resource that is not in the table of the plurality of network resources;
    wherein the network controller generates an error message based on the initialization message from the other network resource that is not in the table of the plurality of network resources.

8. An apparatus, comprising:
    a network resource of a wireless and/or wireline telecommunications network that performs a scheduled transmission of a status message to a network controller of the wireless and/or wireline telecommunications network to indicate an availability of the network resource;
    wherein the network resource receives a request for availability status from the network controller that comprises a heartbeat frequency for the scheduled transmission of the status message;
    wherein the network resource performs the scheduled transmission at the heartbeat frequency;
    wherein the network resource sends an initialization message to the network controller upon an initialization of the network resource;

wherein, upon receipt of a confirmation message from the network controller, the network resource initiates the scheduled transmission of the status message to the network controller;

wherein the scheduled transmission of the status message comprises a synchronous transmission;

wherein the network resource asynchronously sends the initialization message to the network controller upon the initialization of the network resource.

9. The apparatus of claim 8, wherein the network resource receives a request for availability status from the network controller upon an initialization of the network controller;

wherein, upon receipt of the request for availability status, the network resource initiates the scheduled transmission the status message to the network controller.

10. The apparatus of claim 8, wherein the network resource obtains an address for the network controller from a local, provisionable table.

11. The apparatus of claim 10, wherein the initialization message comprises a request for a time interval from the network controller;

wherein the continuation message from the network controller comprises the time interval;

wherein the network resource initiates the scheduled transmission of the one or more status messages to the network controller based on the time interval from the network controller.

12. The apparatus of claim 8 in combination with the network controller, wherein the network resource and the network controller comprise one or more of:

one or more Wireless Intelligent Network (WIN) devices;

one or more Global System for Mobile communication (OSM) and/or Customized Applications for Mobile network Enhanced Logic (CAMEL) network devices;

one or more American National Standards Institute (ANSI) intelligent network devices;

one or more European Telecommunications Standards Institute (ETSI) intelligent network devices; and/or a portion of a distributed architecture that provides a service.

13. The apparatus of claim 8 in combination with the network controller, wherein the network controller and the network resource comprise one of:

a service control point (SCP) and an intelligent peripheral (IP), respectively;

a service control point (SCP) and a service node (SN), respectively;

a service node (SN) and a service node (SN), respectively;

a portion of a first service control point and a portion of a second service control point, respectively;

a first portion of a third service control point and a second portion of the third service control point, respectively;

a portion of a first service node and a portion of a second service node, respectively; or a first portion of a third service node and a second portion of the third service node, respectively.

14. The apparatus of claim 8, wherein the network resource comprises a table of network controllers;

wherein the network resource receives a request for availability status from another network controller that is not in the table of network controllers;

wherein the network resource ignores the request for availability status from the other network controller that is not in the table of network controllers;

wherein the network resource generates an error message based on the initialization message from the other network controller that is not in the table of the one or more network controllers.

15. The apparatus of claim 8, wherein the network resource comprises a table of one or more network controllers that comprises the network controller;

wherein the network resource initiates the scheduled transmission of the status message to each network controller of the one or more network controllers of the table upon an initialization of the network resource to indicate the availability of the network resource.

16. A method, comprising the step of:

sending a request for a scheduled transmission of one or more status messages to a network resource, wherein the request comprises a heartbeat frequency for the scheduled transmission of the one or more status messages, wherein the scheduled transmission occurs at the heartbeat frequency;

making a scheduled determination of an availability of a network resource, of a wireless and/or wireline telecommunications network, based on a determination of success or failure in timely arrival of a status message of the one or more status messages from the network resource;

wherein the step of making the scheduled determination of the availability of the network resource comprises the steps of:

calculating a difference between a current timestamp and a timestamp of the status message;

determining the availability of the network resource to be in-service if the difference between the current timestamp and the timestamp of the status message is less than or equal to a pre-determined time interval;

determining the availability of the network resource to be out-of-service if the difference between the current timestamp and the timestamp of the status message is greater than the pre-determined time interval;

synchronously updating an availability status of the network resource to out-of-service upon determining the availability status of the network resource to be out-of-service;

asynchronously updating the availability status of the network resource to in-service upon an arrival of an additional status message from the network resource.

17. The method of claim 16, wherein the network resource comprises one network resource of a plurality of network resources of the wireless and/or wireline telecommunications network, wherein the step of making the scheduled determination of the availability of the network resource comprises the step of:

making a determination of an availability of the plurality of network resources based on a determination of success or failure in timely arrival of a plurality of status messages from each of the plurality of network resources;

the method further comprising the step of:

automatically updating a table of a plurality of availability statuses that correspond to the plurality of network resources without user intervention based on the determination of the availability of the plurality of network resources or an arrival of one or more of the plurality of status messages.

* * * * *

UNITED STATES PATENT AND TRADEMARK OFFICE
CERTIFICATE OF CORRECTION

PATENT NO. : 7,630,313 B2
APPLICATION NO. : 10/954573
DATED : December 8, 2009
INVENTOR(S) : Batni et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Twenty-first Day of December, 2010

David J. Kappos
*Director of the United States Patent and Trademark Office*